United States Patent
Ishii et al.

(10) Patent No.: US 12,275,428 B2
(45) Date of Patent: Apr. 15, 2025

(54) VEHICLE CONTROL SYSTEM

(71) Applicant: Hitachi Construction Machinery Co., Ltd., Tokyo (JP)

(72) Inventors: Hirotake Ishii, Tokyo (JP); Hidefumi Ishimoto, Tokyo (JP); Akiyoshi Kirimura, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 255 days.

(21) Appl. No.: 17/928,110

(22) PCT Filed: May 11, 2021

(86) PCT No.: PCT/JP2021/017822
§ 371 (c)(1),
(2) Date: Nov. 28, 2022

(87) PCT Pub. No.: WO2021/246114
PCT Pub. Date: Dec. 9, 2021

(65) Prior Publication Data
US 2023/0202512 A1     Jun. 29, 2023

(30) Foreign Application Priority Data
Jun. 1, 2020 (JP) .................................. 2020-095568

(51) Int. Cl.
*B60W 60/00*    (2020.01)
*B60W 30/16*    (2020.01)
(Continued)

(52) U.S. Cl.
CPC .......... *B60W 60/001* (2020.02); *B60W 30/16* (2013.01); *G05D 1/0295* (2013.01);
(Continued)

(58) Field of Classification Search
CPC ......... B60W 2556/65; B60W 2754/10; B60W 30/16; B60W 30/165; B60W 60/001;
(Continued)

(56) References Cited

U.S. PATENT DOCUMENTS 5,365,516 A * 11/1994 Jandrell ................ G01S 5/0009
370/335
6,226,572 B1 * 5/2001 Tojima ................. G05D 1/0297
701/484

(Continued)

FOREIGN PATENT DOCUMENTS

| CN | 109606367 A | * | 4/2019 | ............ B60W 30/16 |
| CN | 111601238 A | * | 8/2020 | ........... H04B 17/309 |

(Continued)

OTHER PUBLICATIONS

International Search Report (PCT/ISA/210) issued in PCT Application No. PCT/JP2021/017822 dated Jul. 13, 2021 with English translation (six (6) pages).

(Continued)

*Primary Examiner* — Babar Sarwar
(74) *Attorney, Agent, or Firm* — Crowell & Moring LLP

(57) ABSTRACT

A vehicle control system that makes it possible to ensure the safety and enhance the productivity at the same time is provided. An unmanned dump 10 receives positional information about a manned vehicle 20 by using infrastructure-to-vehicle communication 520 and infrastructure-to-infrastructure communication 510. In a case where an inter-vehicle distance X between the unmanned dump 10 and the manned vehicle 20 is equal to or shorter than a reference distance Y, the unmanned dump 10 decides whether or not vehicle-to-vehicle communication 550 is established between the unmanned dump 10 and the manned vehicle 20. In a case where it is decided that the vehicle-to-vehicle communication 550 is established, the upper limit of the
(Continued)

travel speed of the unmanned dump 10 is set to a first speed V1, and in a case where it is decided that the vehicle-to-vehicle communication 550 is not established, the upper limit of the travel speed of the unmanned dump 10 is set to a second speed V2.

6 Claims, 10 Drawing Sheets

(51) Int. Cl.
  *G05D 1/00* (2024.01)
  *H04W 64/00* (2009.01)
  *H04W 76/14* (2018.01)
(52) U.S. Cl.
  CPC ........... *H04W 64/00* (2013.01); *H04W 76/14* (2018.02); *B60W 2754/10* (2020.02)
(58) Field of Classification Search
  CPC .. G05D 1/0011; G05D 1/0223; G05D 1/0282; G05D 1/0295; G08G 1/0145; H04W 4/029; H04W 4/46; H04W 64/00; H04W 76/14
  See application file for complete search history.

(56) References Cited

U.S. PATENT DOCUMENTS

| | | | | |
|---|---|---|---|---|
| 6,681,157 | B2* | 1/2004 | Kageyama | G08G 1/163 701/1 |
| 2002/0165645 | A1* | 11/2002 | Kageyama | G01C 21/26 701/1 |
| 2015/0276416 | A1* | 10/2015 | Yamasaki | G08G 1/20 701/537 |
| 2016/0042642 | A1* | 2/2016 | Yamashiro | G08G 1/137 340/990 |
| 2017/0169709 | A1* | 6/2017 | Ando | G08G 1/161 |
| 2017/0261990 | A1* | 9/2017 | Lei | B60W 50/14 |
| 2018/0302835 | A1* | 10/2018 | Yamasaki | H04W 36/34 |
| 2021/0080948 | A1* | 3/2021 | Franco | G05D 1/0033 |
| 2021/0188264 | A1* | 6/2021 | Okuda | G08G 1/096791 |

FOREIGN PATENT DOCUMENTS

| | | | |
|---|---|---|---|
| JP | 7-502153 A | 3/1995 | |
| JP | 10-222227 A | 8/1998 | |
| JP | 2000-315112 A | 11/2000 | |
| JP | 2000-339029 A | 12/2000 | |
| JP | 2006-335239 A | 12/2006 | |
| JP | 2015-225541 A | 12/2015 | |
| JP | 2017-72946 A | 4/2017 | |
| JP | 2019-51799 A | 4/2019 | |
| WO | WO-2017105319 A1 * | 6/2017 | |
| WO | WO-2019134758 A1 * | 7/2019 | .......... G08G 1/0141 |
| WO | WO-2020195358 A1 * | 10/2020 | |

OTHER PUBLICATIONS

Japanese-language Written Opinion (PCT/ISA/237) issued in PCT Application No. PCT/JP2021/017822 dated Jul. 13, 2021 (five (5) pages).

* cited by examiner

F I G . 9
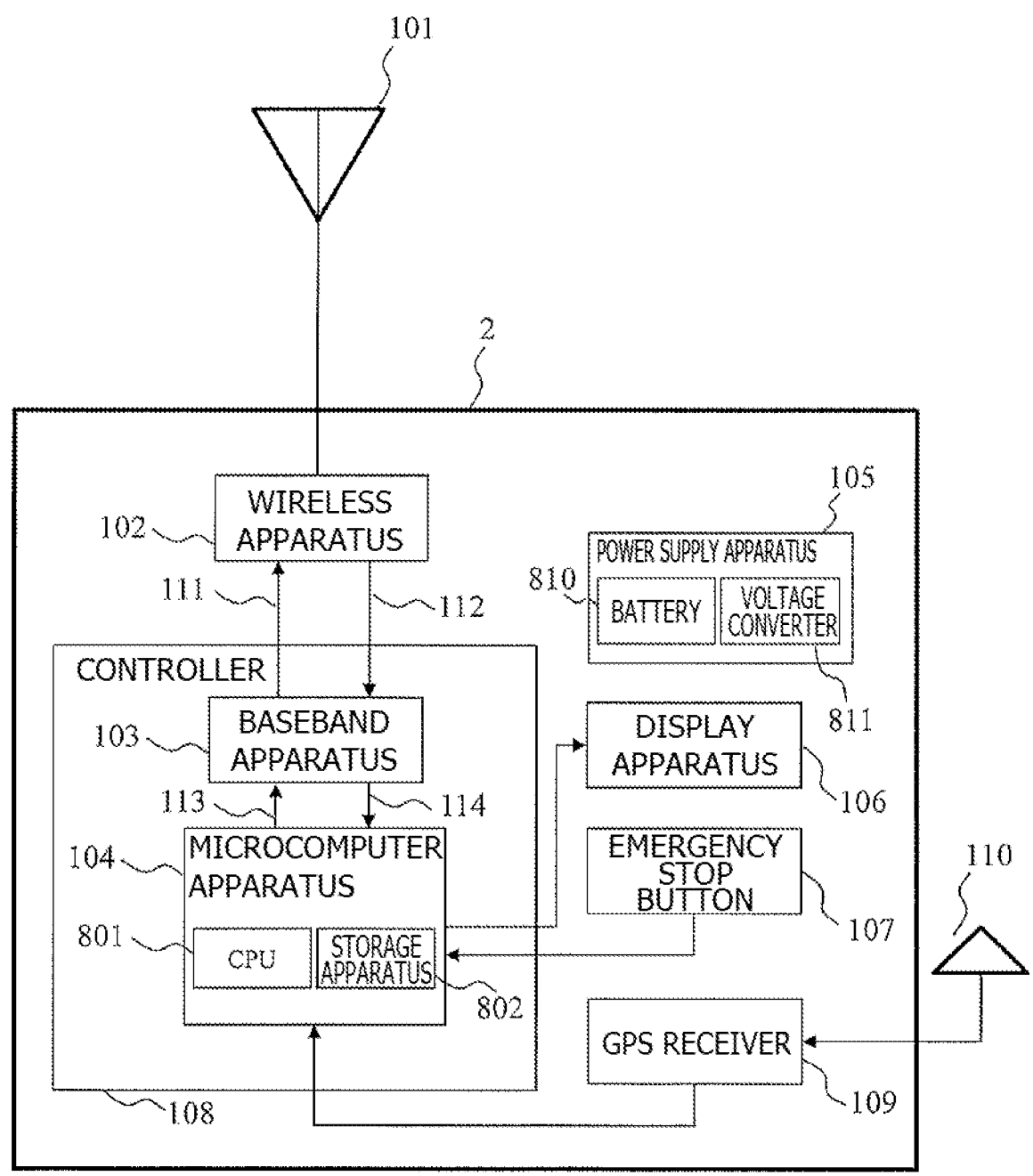

VEHICLE CONTROL SYSTEM

TECHNICAL FIELD

The present invention relates to a vehicle control system, and particularly relates to a vehicle control system that enables speed control of autonomous travel vehicles at a mining site or the like.

BACKGROUND ART

There is a great demand about mining sites for causing haulage vehicles to autonomously travel due to an increase in labor costs, and requests for enhancement of the safety. To meet this demand, there are known technologies in which haulage vehicles that haul earth/sand or mineral at mining sites are caused to autonomously travel according to instructions from a control server or the like, not depending on human driving.

For example, Patent Document 1 discloses a technology in which inter-vehicle positional data is transmitted to monitor mutual positional relations, and in a case where vehicles have approached each other too much, the vehicles are decelerated or stopped to avoid interference.

In addition, Patent Document 2 discloses a technology in which an emergency stop signal is transmitted to all haulage vehicles travelling in a mining site only when an emergency stop input apparatus is operated for a haulage vehicle travelling in the mining site.

In addition, Patent Document 3 discloses a vehicle interference avoidance technology in which the range of presence of a vehicle taking into consideration a length of time required for measuring the position of the vehicle is determined to thereby enable a safe prediction of the position of the vehicle even in a case where the frequency of wireless communication is low, and enable avoidance of interference between unmanned vehicles or manned vehicles in the entire area of a large work site.

PRIOR ART DOCUMENT

Patent Documents

Patent Document 1: JP-H10-222227-A
Patent Document 2: JP-2017-72946-A
Patent Document 3: Japanese Patent Application No. H11-152026

SUMMARY OF THE INVENTION

Problem to be Solved by the Invention

However, if haulage vehicles are decelerated or stopped frequently, the haulage efficiency lowers, leading to a lower productivity of the mining work at a mine. Because of this, there is a demand for a technology to decelerate or stop haulage vehicles only when needed.

Taking safety into consideration, also a functionality to transmit and receive inter-vehicle positional data, monitor mutual positional relations, and ensure the safety by decelerating vehicles in a case where the vehicles have approached each other is necessary. In that case, there is a demand, from the perspective of maintaining the productivity of the mining work at a mine, for increasing the speed after the deceleration as much as possible or for shortening the deceleration time as much as possible while ensuring the safety.

However, it is difficult, with the technologies disclosed in Patent Document 1, Patent Document 2, and Patent Document 3 described above, to ensure the safety and enhance the productivity at the same time.

The present invention has been made in view of the problem described above, and an object of the present invention is to provide a vehicle control system that makes it possible to ensure the safety and enhance the productivity at the same time.

Means for Solving the Problem

An example of a vehicle control system according to the present invention comprises: an autonomous travel vehicle; a manned vehicle; and a plurality of communication lines that connect the autonomous travel vehicle and the manned vehicle with each other. Further, in the vehicle control system, the manned vehicle transmits positional information about the manned vehicle by using a first communication line, the autonomous travel vehicle uses the first communication line to receive the positional information about the manned vehicle, and the autonomous travel vehicle decides whether or not an inter-vehicle distance between the autonomous travel vehicle and the manned vehicle is equal to or shorter than a reference distance on the basis of the positional information about the manned vehicle and positional information about the autonomous travel vehicle. Furthermore, in a case where the inter-vehicle distance is equal to or shorter than the reference distance, the autonomous travel vehicle: decides whether or not a second communication line that uses a communication path different from the first communication line is established between the autonomous travel vehicle and the manned vehicle; sets an upper limit of a travel speed of the autonomous travel vehicle to a first speed in a case where it is decided that the second communication line is established; and sets the upper limit of the travel speed of the autonomous travel vehicle to a second speed in a case where it is decided that the second communication line is not established.

The present specification incorporates the content disclosed by Japanese Patent Application No. 2020-095568, which forms the basis of the priority of the present application.

Advantages of the Invention

According to the vehicle control system of the present invention, it becomes possible to reduce unnecessary decelerations of an autonomous travel vehicle while maintaining the safety in a case where the autonomous travel vehicle and a manned vehicle have approached each other, and it becomes possible to enhance the safety and enhance the productivity at the same time.

BRIEF DESCRIPTION OF THE DRAWINGS

FIG. 9 is a block diagram depicting a configuration example of a vehicle-mounted transmitting terminal.

MODES FOR CARRYING OUT THE INVENTION

Figure 1:
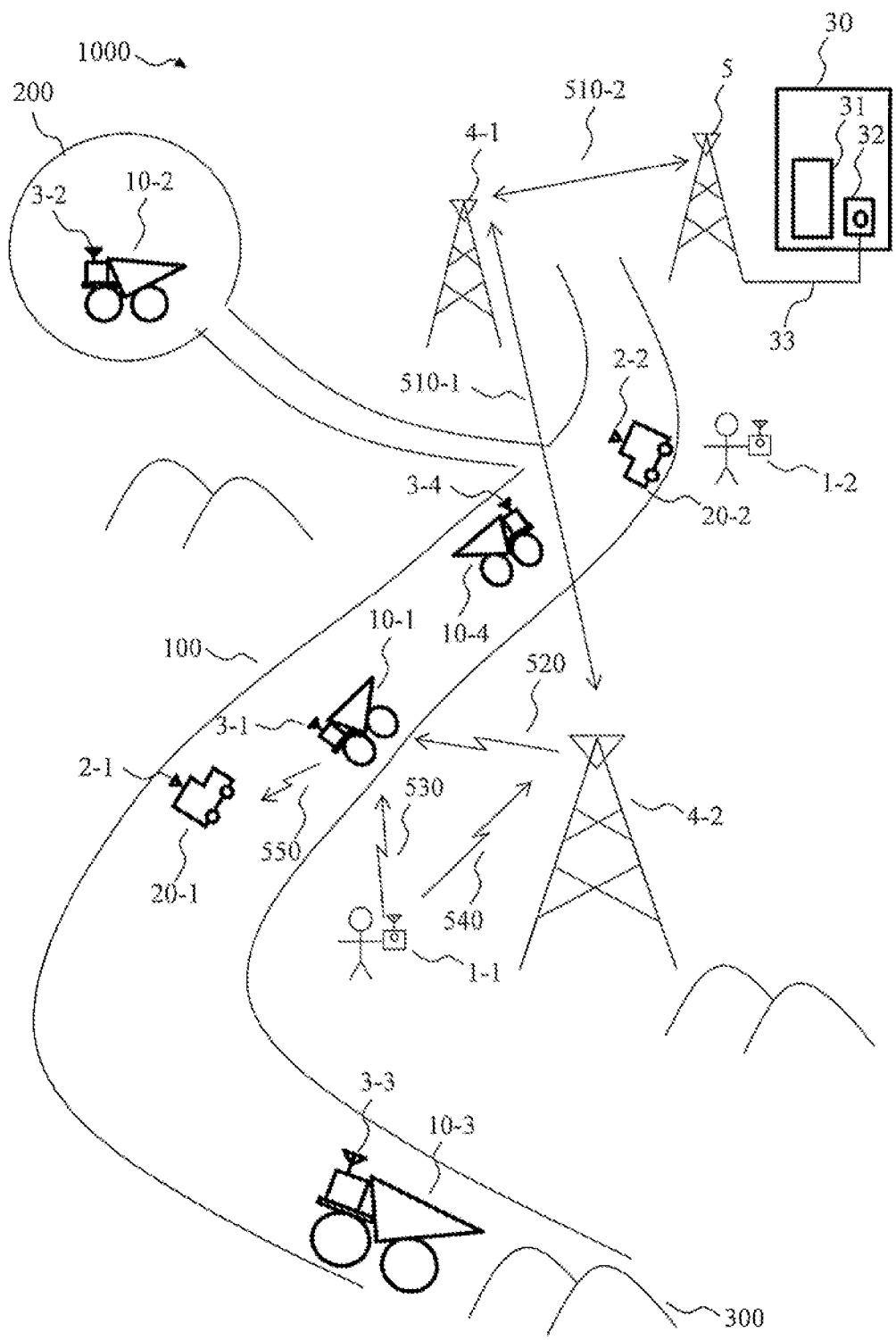
FIG. 1 is a schematic diagram depicting an example of overall configuration of a vehicle control system according to a first embodiment.

An embodiment is explained below in detail on the basis of the diagrams. Note that in all the diagrams for explaining the embodiment, members having an identical functionality are given the same or related reference characters, and repetitive explanations thereof are omitted in some cases. In addition, in the following embodiment, explanations of the same or similar portions are not repeated in principle, except when they are particularly necessary.

The explanation of the following embodiment is divided into a plurality of sections or embodiments when it is necessary to do so for convenience. In a case where quantities or the like related to an element (including the number of the element, a numerical value related to the element, the amount of the element, a range related to the element, and so on) are mentioned in the following embodiment, the quantities are not limited to particular numbers unless clearly noted otherwise particularly, except when those quantities are obviously limited to the particular numbers in principle, and so on, and the quantities may be equal to or greater than or equal to or smaller than the particular numbers. Note that constituent elements (including processing steps and the like) of the following embodiment are not necessarily essential unless clearly noted otherwise particularly, except when those constituent elements are obviously essential in principle, and so on.

First Embodiment

A vehicle control system according to a first embodiment of the present invention is explained below in detail with reference to diagrams. FIG. 1 is a schematic diagram depicting an example of overall configuration of a vehicle control system 1000 of the first embodiment. The vehicle control system 1000 functions also as an emergency stop system that stops autonomous travel vehicles at a time of emergency.

In FIG. 1, the vehicle control system 1000 includes: mobile transmitting terminals 1-1 to 1-2; vehicle-mounted transmitting terminals 2-1 to 2-2; vehicle-mounted receiving terminals 3-1 to 3-4; relay base stations 4-1 to 4-2; a central-control base station 5; autonomous travel vehicles (hereinafter called "unmanned dumps") 10-1 to 10-4; manned vehicles 20-1 to 20-2 that are driven by humans; and a control center 30.

For example, the vehicle control system 1000 is installed at a mine. The unmanned dumps 10-1 to 10-4 are vehicles that can travel autonomously in an unmanned state. For example, the unmanned dumps 10-1 to 10-4 are used as haulage vehicles that haul earth/sand or mining objects for the purpose of hauling a load such as earth/sand or ore. In addition, an operation management system 31 and an emergency stop input apparatus 32 are installed in the control center 30.

Note that the number of each type of apparatus is not limited to a number depicted in the diagrams or to a particular number. For example, there may be only one vehicle-mounted receiving terminal and unmanned dump, or there may be a plurality of vehicle-mounted receiving terminals and/or unmanned dumps. In addition, there may be only one vehicle-mounted transmitting terminal and manned vehicle, or there may be a plurality of vehicle-mounted transmitting terminals and/or manned vehicles.

In addition, although not depicted, an autonomous travelling assisting system for autonomous travelling of the unmanned dumps 10-1 to 10-4 is provided at a work site in a mine.

All the mobile transmitting terminals 1-1 and 1-2 may have identical configuration or may each have different configuration. In the description below, the mobile transmitting terminals 1-1 and 1-2 are collectively referred to as "mobile transmitting terminals 1" without making a distinction therebetween, in some cases. Similarly, the vehicle-mounted transmitting terminals 2-1 and 2-2, the vehicle-mounted receiving terminals 3-1 to 3-4, and the relay base stations 4-1 and 4-2 also are collectively referred to as "vehicle-mounted transmitting terminals 2," "vehicle-mounted receiving terminals 3," and "relay base stations 4," respectively, in the description in some cases. In addition, since all the unmanned dumps 10-1 to 10-4 also may have identical configuration, they are described as "unmanned dumps 10" in a case where they are collectively referred to, in some cases. The manned vehicles 20-1 and 20-2 also are collectively referred to as "manned vehicles 20" in some cases.

An unmanned dump 10 is an autonomous travel vehicle configured to be capable of travelling in an unmanned state on the basis of control by the vehicle control system 1000, and is operated in principle without a driver getting on it. Note that, whereas controlled objects of the vehicle control system 1000 are the unmanned dumps 10 in the present embodiment, autonomous travel vehicles which are controlled objects of the vehicle control system 1000 are not limited to unmanned dumps, and manned dumps also may be controlled objects at the same time, and it is also possible to perform control similar to that for the unmanned dumps 10.

In an unmanned state, the unmanned dumps 10 autonomously travel on roads 100 that are preset in a mining site. For example, excavators that perform work of loading earth/sand or ore are deployed at a loading site 200, and the unmanned dumps 10 go back and forth between the excavators and a soil-dropping site 300 along the roads 100, and haul the loads.

Note that at the mining site, the manned vehicles 20 also are travelling, in addition to the unmanned dumps 10 that haul loads such as earth/sand or ore. The manned vehicles 20 are vehicles that are configured such that drivers or other personnel can get on them, and are configured such that the drivers can perform driving operation of them. Examples of the manned vehicles 20 include excavators as mentioned above, bulldozers that level the road surfaces of the roads 100, water-sprinkling vehicles, service cars that patrol the mining site, and the like.

A mobile transmitting terminal 1 is a mobile apparatus that can be carried by an operator in the mining site. The mobile transmitting terminal 1 has a functionality as an emergency stop apparatus that gives an instruction for emergently stopping an unmanned dump 10 at a time of emergency.

A vehicle-mounted transmitting terminal 2 is a vehicle-mounted apparatus mounted on a manned vehicle 20. The vehicle-mounted transmitting terminal 2 also has a functionality as an emergency stop apparatus, and a driver or personnel on board the manned vehicle 20 can give an instruction for emergently stopping the unmanned dumps 10 by using the vehicle-mounted transmitting terminal 2 at a time of emergency.

The mobile transmitting terminals 1 and the vehicle-mounted transmitting terminals 2 can transmit emergency stop command signals. For example, the emergency stop command signals can be transmitted from the roads 100, the loading site 200, the soil-dropping site 300, and the like in the site.

In addition, a vehicle-mounted receiving terminal 3 can directly or indirectly receive emergency stop command signals transmitted from the mobile transmitting terminals 1 or the vehicle-mounted transmitting terminals 2.

Note that the definition of a "time of emergency" is not limited particularly in the present embodiment, and an operator or a driver of a manned vehicle 20 or the like can determine that it is a time of emergency as her/his decision. Typical criteria used for determining that it is a time of emergency are those related to general situations where it is necessary to stop an unmanned dump 10, and, for example, the situations include a situation where there is a possibility of collision and/or interference between unmanned dumps 10 or between an unmanned dump 10 and a manned vehicle 20, a situation where there is a possibility of collision and/or interference between an operator and an unmanned dump 10, and the like.

The vehicle-mounted receiving terminals 3-1 to 3-4 are wireless receiving apparatuses mounted on the unmanned dumps 10-1 to 10-4, respectively. The vehicle-mounted receiving terminals 3-1 to 3-4 can receive signals transmitted from the mobile transmitting terminals 1 or the vehicle-mounted transmitting terminals 2. The signals include emergency stop command signals for stopping the unmanned dumps 10-1 to 10-4.

Emergency stop command signals can also be directly received from the mobile transmitting terminals 1 or the vehicle-mounted transmitting terminals 2, and emergency stop command signals can also be received by being relayed via the relay base stations 4 or the central-control base station 5.

If the vehicle-mounted receiving terminals 3-1 to 3-4 receive emergency stop command signals, in response, the unmanned dumps 10-1 to 10-4 stop travelling. Installation locations of antennas of the vehicle-mounted receiving terminals 3 mounted on the unmanned dumps 10 are not limited to particular locations. As an example, the antennas can be installed at locations with good reception of radio waves, for example at front portions on the upper surfaces of the unmanned dumps 10.

Each relay base station 4 or the central-control base station 5 is a wireless base station that relays communication related to the unmanned dumps 10 and the manned vehicles 20. The position where each relay base station 4 or the central-control base station 5 is installed is determined such that wireless communication of the unmanned dumps 10 and the manned vehicles 20 becomes possible. For example, areas where there is a possibility that the unmanned dumps 10 or the manned vehicles 20 move include the roads 100, the loading site 200, the soil-dropping site 300, and the like, and the position of each relay base station 4 or the central-control base station 5 is determined such that wireless communication of the unmanned dumps 10 and the manned vehicles 20 positioned in those areas becomes possible.

The relay base stations 4 are connected with each other by wireless lines. In addition, the relay base stations 4 and the central-control base station 5 also are connected with each other by wireless lines. The relay base stations 4 and the central-control base station 5 relay emergency stop command signals transmitted from the mobile transmitting terminals 1 and the vehicle-mounted transmitting terminals 2, and thereby a command for emergently stopping all the unmanned dumps 10 in the mining site can be given.

In a case where an emergency stop command signal is given from any of the mobile transmitting terminals 1 and the vehicle-mounted transmitting terminals 2, not only unmanned dumps 10 that are actually required to stop, but all the unmanned dumps 10 are stopped, in possible configuration.

In this manner, the mobile transmitting terminals 1 and the vehicle-mounted transmitting terminals 2 are terminals that can transmit emergency stop command signals as instructions for stopping the unmanned dumps 10. The unmanned dumps 10 stop upon receiving the emergency stop command signals.

The emergency stop input apparatus 32 is installed in the control center 30. The emergency stop input apparatus 32 and the central-control base station 5 are connected communicatively with each other by a cable line 33. The emergency stop input apparatus 32 is an apparatus that gives an emergency stop command according to operation by an operator. An operator in the control center 30 can give an emergency stop command to all the unmanned dumps 10 through the central-control base station 5 by using the emergency stop input apparatus 32. Note that whereas the emergency stop input apparatus 32 is explained as being connected with the central-control base station 5, it may be connected not with the central-control base station 5, but with a relay base station 4, in other possible configuration. The emergency stop input apparatus 32 also is a terminal that can transmit an emergency stop command signal as an instruction for stopping the unmanned dumps 10.

For example, the vehicle-mounted transmitting terminals 2 and the vehicle-mounted receiving terminals 3-1 to 3-4 have mounted thereon GPS receivers as means for acquiring information about their own positions. By using the GPS receivers, the manned vehicles 20 and the unmanned dumps 10 can acquire the information about their own positions.

A vehicle-mounted transmitting terminal 2 mounted on a manned vehicle 20 has a functionality of transmitting information about its own position. A vehicle-mounted receiving terminal 3 mounted on an unmanned dump 10 can determine a distance (inter-vehicle distance) between the unmanned dump 10 and each manned vehicle 20 by using positional information about the manned vehicle 20 sent from the manned vehicle 20, and information about its own position acquired from a GPS receiver mounted on the unmanned dump 10. Note that certainly there are no problems even if the method of acquiring information about its own position is a method that does not use a GPS.

Figure 2:
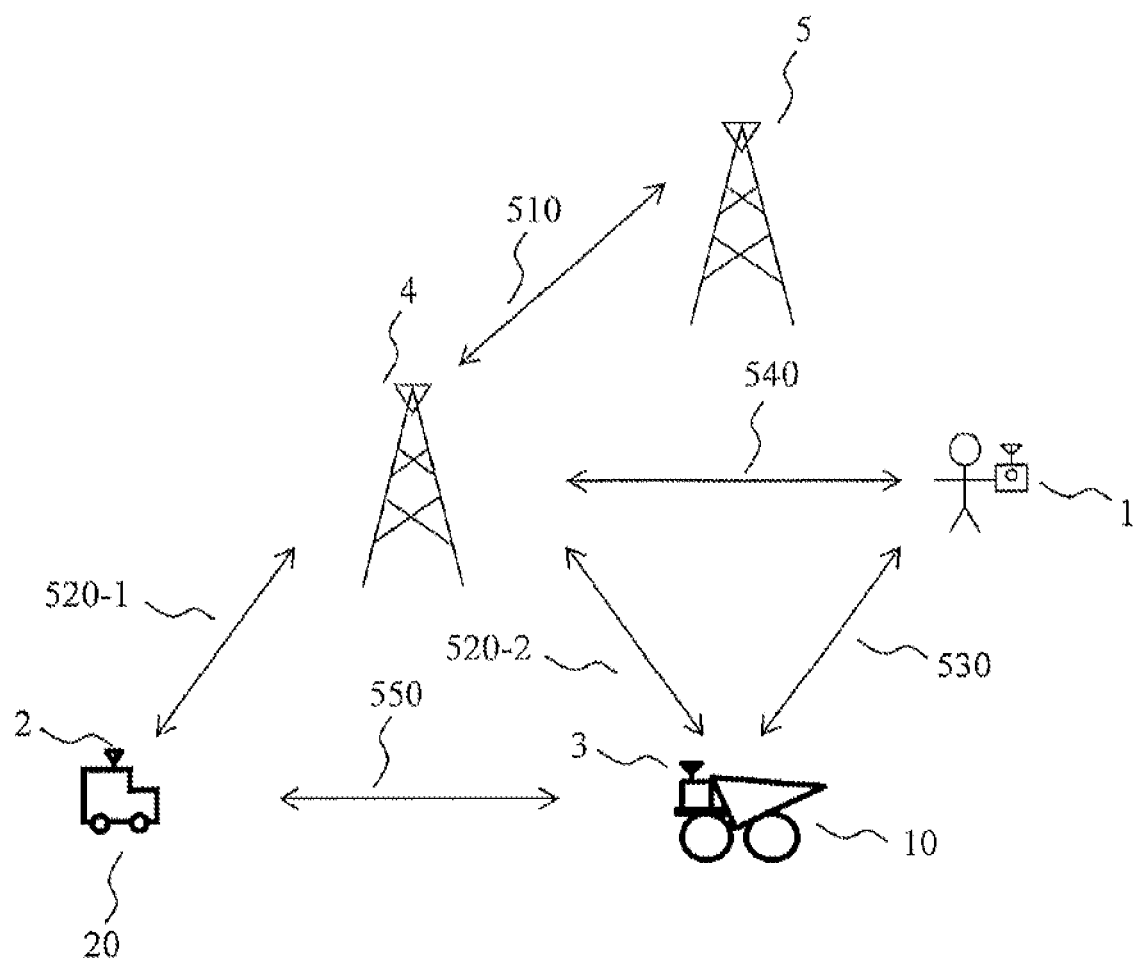
FIG. 2 is a diagram depicting in detail a relation between wireless lines in the vehicle control system in FIG. 1.

FIG. 2 is a diagram depicting in detail a relation among wireless lines related to a mobile transmitting terminal 1, a vehicle-mounted transmitting terminal 2, a vehicle-mounted receiving terminal 3, a relay base station 4, the central-control base station 5, an unmanned dump 10, and a manned vehicle 20.

Note that wireless lines set in this vehicle control system 1000 are defined as follows in the explanation of the present embodiment.

- A wireless line for performing mutual communication between relay base stations 4 or between a relay base station 4 and the central-control base station 5 is called as "infrastructure-to-infrastructure communication 510."
- A wireless line for performing mutual communication between a relay base station 4 and an unmanned dump 10 or a manned vehicle 20 is called as "infrastructure-to-vehicle communication 520."
- A wireless line for performing mutual communication between a mobile transmitting terminal 1 and an unmanned dump 10 is called as "pedestrian-to-vehicle communication 530."
- A wireless line for performing mutual communication between a mobile transmitting terminal 1 and a relay base station 4 is called as "pedestrian-to-infrastructure communication 540."
- A wireless line for performing mutual communication between an unmanned dump 10 and a manned vehicle 20 is called as "vehicle-to-vehicle communication 550."

Figure 3:
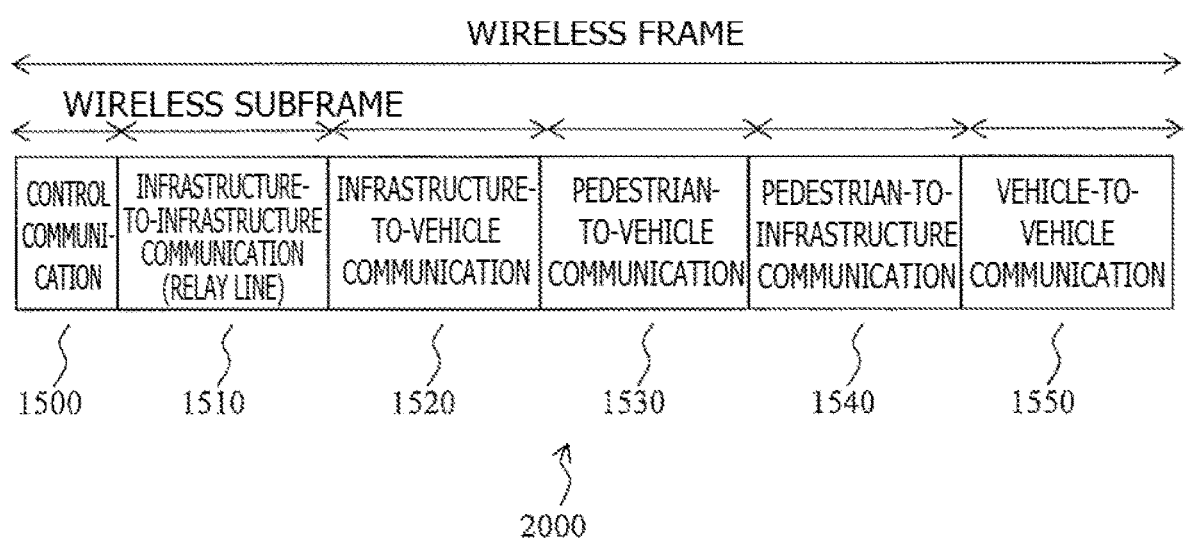
FIG. 3 is a schematic diagram depicting an example of a wireless frame and subframes used in the vehicle control system in FIG. 1.

FIG. 3 is a diagram depicting an example of a wireless frame and subframes used in the vehicle control system 1000. When a plurality of communication channels related to a plurality of wireless base stations and a plurality of wireless terminals are multiplexed, various multiplexing methods are adopted for avoiding mutual communication interference.

Known multiplexing methods for avoiding interference include: the CSMA-CA (Carrier Sense Multiple Access/Collision Avoidance) method using carrier-sense used in a Wi-Fi system or the like; and the time division multiplexing method called as TDMA (Time Division Multiple Access) in which a wireless frame is divided in advance into units called as subframes, and communication opportunities are given regularly. Note that, in a case where OFDM (Orthogonal Frequency Division Multiple) is adopted as a modulation method in addition to these, this means that orthogonal frequency division multiplexing called as OFDMA (Orthogonal Frequency Division Multiple Access) is used.

Typically, the CSMA-CA method has a problem that it becomes difficult to obtain communication opportunities if the numbers of wireless base stations and wireless terminals increase. Because of this, in a wireless system that places importance on safety, the time division multiplexing method in which opportunities for communication are given regularly is adopted often.

In subframe allocation 2000 depicted in FIG. 3, a wireless frame is divided at predetermined intervals according to the time division multiplexing method. For example, each wireless frame has a duration of one second. For example, in accordance with a plurality of communication channels, the wireless frame can be divided into a control communication subframe 1500 for allocating control communication, an infrastructure-to-infrastructure communication subframe 1510 for allocating the infrastructure-to-infrastructure communication 510, an infrastructure-to-vehicle communication subframe 1520 for allocating the infrastructure-to-vehicle communication 520, a pedestrian-to-vehicle communication subframe 1530 for allocating the pedestrian-to-vehicle communication 530, a pedestrian-to-infrastructure communication subframe 1540 for allocating the pedestrian-to-infrastructure communication 540, and a vehicle-to-vehicle communication subframe 1550 for allocating the vehicle-to-vehicle communication 550.

The control communication includes communication for distributing notification parameters necessary for the mobile transmitting terminals 1, the vehicle-mounted transmitting terminals 2, the vehicle-mounted receiving terminals 3, and the relay base stations 4 to start communication, and communication for going through a connection procedure necessary for starting mutual communication thereamong.

Note that although not depicted in FIG. 3, intervals called as guard time for avoiding interference due to differences between propagation delays are actually provided between the subframes. In addition, in a case where the TDD (Time Division Duplex) method in which the same frequency is used for communication on an uplink and a downlink is adopted, the subframes can be divided into two for the downlink and the uplink. Instead of the TDD method, the FDD method (Frequency Division Duplex) in which different frequencies are used for communication on a downlink and an uplink can also be adopted.

Note that each of the mobile transmitting terminals 1, the vehicle-mounted transmitting terminals 2, the vehicle-mounted receiving terminals 3, the relay base stations 4, or the central-control base station 5 is allocated a subframe that is decided in advance depending on which it communicates with. Since a subframe is given for each wireless frame, in each wireless frame, each of the mobile transmitting terminals 1, the vehicle-mounted transmitting terminals 2, the vehicle-mounted receiving terminals 3, the relay base stations 4, or the central-control base station 5 is necessarily given a communication opportunity, and an emergency stop signal and positional information are exchanged.

In a case where there are a plurality of any of mobile transmitting terminals 1, vehicle-mounted transmitting terminals 2, vehicle-mounted receiving terminals 3, and relay base stations 4, a subframe may further be divided corresponding to each of the plurality of terminals or stations (or corresponding to each combination of them).

Figure 4:
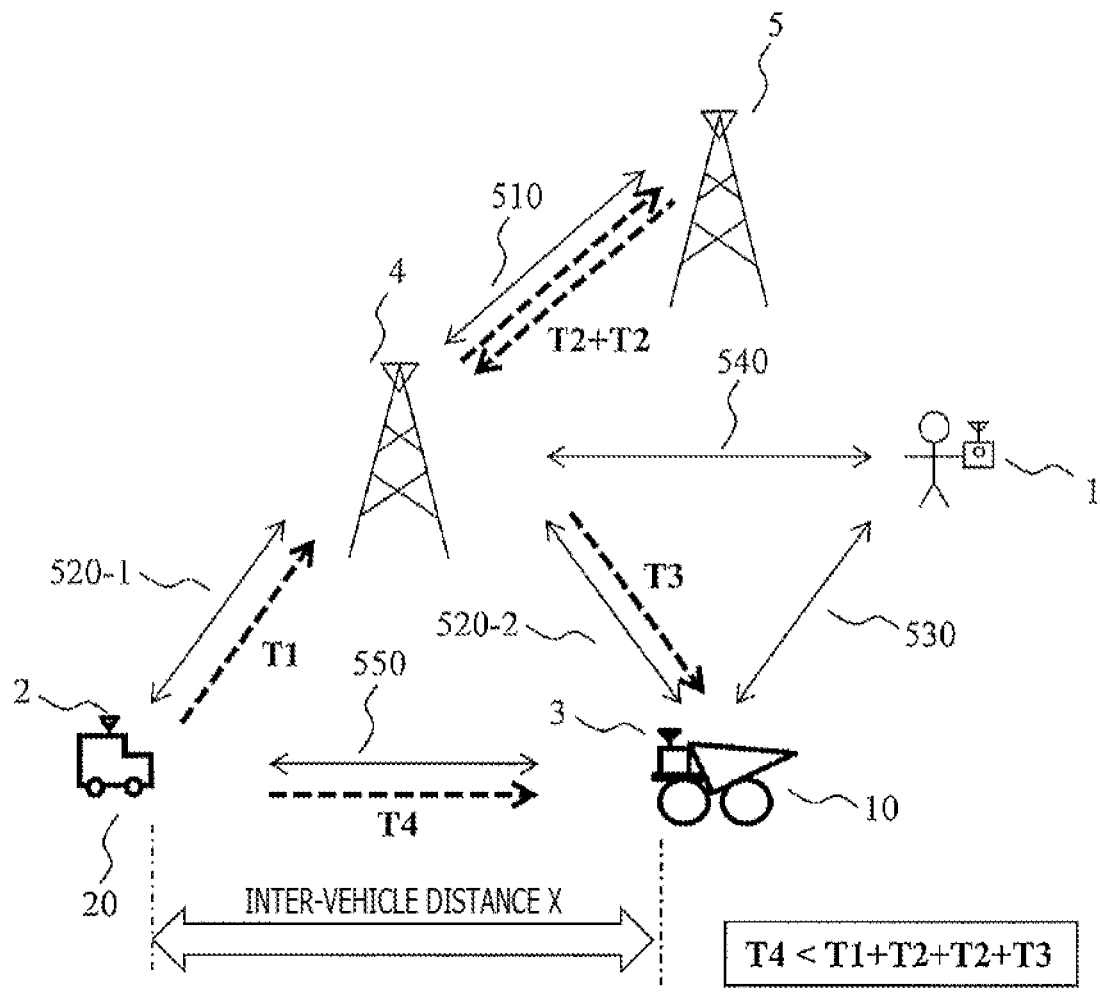
FIG. 4 is a diagram in which communication delays are given to the wireless lines in FIG. 2.

FIG. 4 is a diagram depicting an example of operation of approach detection and emergency stop in the vehicle control system 1000 of the first embodiment. At the normal time, a manned vehicle 20 acquires information about its own position from the GPS receiver (not depicted) mounted on the vehicle-mounted transmitting terminal 2.

The manned vehicle 20 uses a first communication line to transmit the information about its own position and an emergency stop signal to an unmanned dump 10. For example, the first communication line is a communication line that goes through a wireless base station. In the present embodiment, it is a line that goes through infrastructure-to-vehicle communication 520-1, the infrastructure-to-infrastructure communication 510, and infrastructure-to-vehicle communication 520-2 in this order.

In addition, the manned vehicle 20 uses a second communication line to transmit the information about its own position and an emergency stop signal to an unmanned dump 10. The second communication line is a line including communication paths different from those of the first communication line. For example, the second communication line is a communication line that does not go through a wireless base station, that is, a line that does not go through the infrastructure-to-vehicle communication 520 and the infrastructure-to-infrastructure communication 510. In the present embodiment, the second communication line includes only the vehicle-to-vehicle communication 550.

In this manner, the first communication line and the second communication line can be used in the time division multiplexing method. In that case, the first communication line and the second communication line can be used in mutually overlapping frequency bands, and this allows efficient use of communication bandwidths.

By preparing two types of communication line in this manner, it becomes possible to perform efficient communication according to the situation. For example, in a case where the unmanned dump 10 and the manned vehicle 20 have a positional relation that allows direct communication, they can communicate with each other at a high speed without using a communication line that goes through the infrastructure-to-vehicle communication 520 and the infrastructure-to-infrastructure communication 510, and in a case where the unmanned dump 10 and the manned vehicle 20 have a positional relation that does not allow direct communication, they can use a wide area communication line that goes through the infrastructure-to-vehicle communication 520 and the infrastructure-to-infrastructure communication 510.

On the other hand, the unmanned dump 10 uses the first communication line and the second communication line to receive the positional information about the manned vehicle 20. In addition, the unmanned dump 10 acquires information about its own position (for example, similarly to the manned vehicle 20). Then, the unmanned dump 10 determines an inter-vehicle distance X between the unmanned dump 10 and the manned vehicle 20 by using the information about its own position and the positional information about the manned vehicle 20.

In this manner, the vehicle control system 1000 includes a plurality of communication lines connecting the unmanned dumps 10 and the manned vehicles 20 with each other. Note that whereas both the first communication line and the second communication line are available in the state supposed in the description above, one or both of the communication lines is/are unavailable depending on the situation, in some possible cases.

Figure 5:
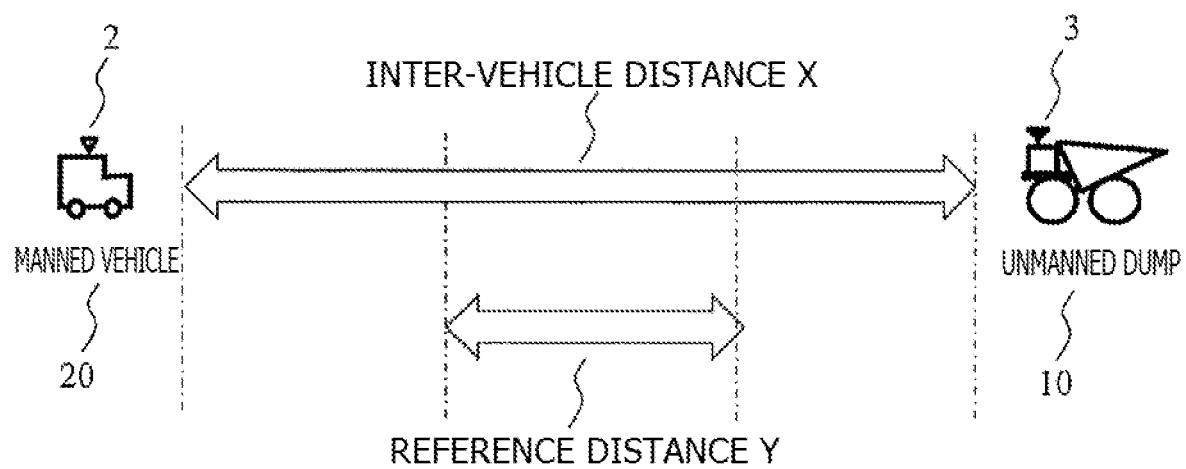
FIG. 5 is a diagram depicting an inter-vehicle distance threshold used for deciding that approach is detected.

As depicted in FIG. 5, on the basis of the positional information about the manned vehicle 20 received by using the first communication line from the manned vehicle 20, the unmanned dump 10 decides whether or not the inter-vehicle distance X to the manned vehicle 20 is equal to or shorter than a preset reference distance Y. The reference distance Y is a reference distance for detecting that the unmanned dump 10 and the manned vehicle 20 have approached each other, and in a case where the inter-vehicle distance X is equal to or shorter than the reference distance Y, it is decided that it is detected that the unmanned dump 10 and the manned vehicle 20 have approached each other.

In a case where the inter-vehicle distance X is equal to or shorter than the reference distance Y, the unmanned dump 10 decelerates to a preset travel speed for ensuring safety. Note that a method of determining the travel speed after the deceleration is mentioned later.

In the present specification, a "speed" is a value representing only a speed not including directional information, for example.

Here, a communication delay related to each communication line in FIG. 4 is defined as follows.

A communication delay of the infrastructure-to-vehicle communication 520 for performing mutual communication between a relay base station 4 and a manned vehicle 20 is defined as T1.

A communication delay of the infrastructure-to-infrastructure communication 510 for performing mutual communication between a relay base station 4 and the central-control base station 5 is defined as T2.

A communication delay of the infrastructure-to-vehicle communication 520 for performing mutual communication between a relay base station 4 and an unmanned dump 10 is defined as T3.

A communication delay of the vehicle-to-vehicle communication 550 for performing mutual communication between an unmanned dump 10 and a manned vehicle 20 is defined as T4.

The total of communication delays in a case where positional information is transferred from a manned vehicle 20 to an unmanned dump 10 by using the first communication line is T1+T2+T2+T3. This total value can be measured in advance, and stored on a storage apparatus of the unmanned dump 10 or the vehicle-mounted receiving terminal 3.

On the other hand, a communication delay in a case where positional information is transferred from a manned vehicle 20 by using the second communication line (e.g. by using the vehicle-to-vehicle communication 550 for performing direct communication between an unmanned dump 10 and the manned vehicle 20) includes only T4. This value can be measured in advance, and stored on a storage apparatus of the unmanned dump 10 or the vehicle-mounted receiving terminal 3.

It is supposed in this example that the communication delay related to the second communication line is shorter than the communication delay related to the first communication line. That is, T4<T1+T2+T2+T3.

Figure 6:
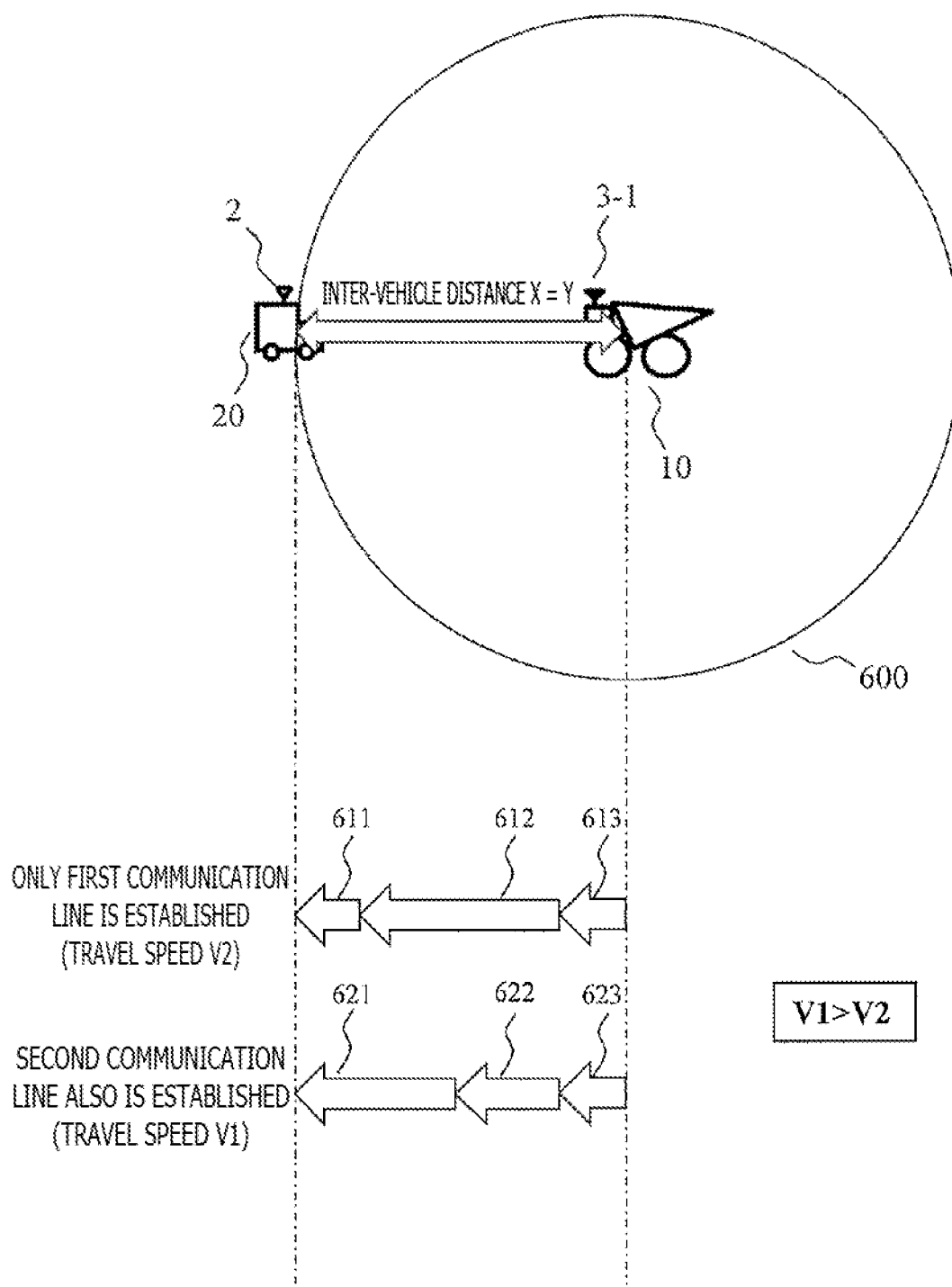
FIG. 6 is a schematic diagram depicting a movable distance of an unmanned dump.

FIG. 6 is a schematic diagram depicting how it appears in a case where a manned vehicle 20 and an unmanned dump 10 have approached each other. FIG. 6 is a diagram about a time point at which the inter-vehicle distance X becomes equal to the reference distance Y. An area that has its center on the unmanned dump 10, and has a radius which is equal to the reference distance Y is defined as a movable range 600.

For example, the reference distance Y is computed in advance as such a distance that the unmanned dump 10 travelling toward the stopped manned vehicle 20 can stop safely if the unmanned dump 10 starts being braked when it is at the distance. In the present embodiment, the reference distance Y is computed according to the estimated sum of a braking distance, a free running distance and an error of positional information.

FIG. 6 depicts a breakdown of the reference distance Y corresponding to communication using each communication line. The unmanned dump 10 travels at a second speed V2 in a case where communication using only the first communication line is performed. That is, this is equivalent to a case where the second communication line is unavailable.

It is supposed that the unmanned dump 10 travels at a first speed V1 in a case where communication using the second communication line is possible.

The first speed V1 and the second speed V2 are upper limits, and the unmanned dump 10 travels at a speed lower than them depending on the situation in some cases. In an example in explained below, the unmanned dump 10 always travels at one of those upper limits.

The method for acquiring braking distances 611 and 621 can be designed as desired. For example, the braking distances 611 and 621 may be fixed values, may be the same value, or may be mutually different values. In addition, the braking distances 611 and 621 may be values computed on the basis of a travel speed. Functions representing the braking distances 611 and 621 using the travel speed as variables may be defined in advance. The formats of the functions can be designed as desired, and may be linear functions of a travel speed, may be quadratic functions of a travel speed, or may be functions in other formats.

Free running distances 612 and 622 can be computed on the basis of a travel speed and free running time, and can be computed by multiplying these, for example. For example, the free running time is a length of time that elapses until a communication interruption is detected after the occurrence of the communication interruption, and differs depending on the communication lines.

In the present embodiment, the free running time is set to a value which is equal to a communication delay of each communication line. That is, in a case where neither positional information nor an emergency stop signal can be received in a period equivalent to the communication delay, it is decided that a communication interruption is detected. Note that a communication delay of each communication line can be predetermined and stored in the manner mentioned above.

Positional information errors 613 and 623 are fixed values, and may be the same value or mutually different values for the communication lines.

As a specific example, in a case where time that has elapsed after the last reception of positional information about the manned vehicle 20 using the second communication line has become longer than the communication delay related to the second communication line, the unmanned dump 10 decides that a communication interruption of the second communication line is detected. A decision regarding the first communication line also may be made similarly.

The explanation above is summarized below. The reference distance Y is a constant. The braking distances 611 and 621 are constants or computed in accordance with functions including the travel speed related to each situation as variables. Since the free running time is a constant that differs depending on the situation as described above, the free running distances 612 and 622 also are computed in accordance with functions including the travel speed as variables. Both the positional information errors 613 and 623 are constants. Accordingly, the reference distance Y can be represented by an equation including, as a variable, the travel speed related to each situation, and by solving the equation, the travel speed related to each situation can be calculated. The specific calculation content for solving the equation can be designed by those skilled in the art as appropriate on the basis of a known technology or the like.

Regarding a case where only the first communication line is established, and a case where the second communication line is established in addition to the first communication line as depicted in FIG. 6, specific examples of the method of calculating the travel speed related to each situation are explained below.

First, the case where only the first communication line is established is explained. It is supposed that the reference distance Y is 35 m. It is supposed that the positional information error 613 in the case where only the first communication line is established is 10 m. It is supposed that the braking distance 611 is a fixed value of 10 m. In this case, the free running distance 612 is 35−10−10=15 [m]. Supposing that the communication delay of the first communication line is three seconds, the second speed V2 is 15/3=5 [m/s]=18 [km/h].

Accordingly, in a case where it is decided that the inter-vehicle distance X to the manned vehicle 20 is equal to or shorter than the reference distance Y, the unmanned dump 10 is decelerated to 18 km/h, and passes by the manned vehicle 20 at 18 km/h. It is supposed that thereafter they move away from each other, and the inter-vehicle distance X becomes longer than the reference distance Y. In that case, the unmanned dump 10 travels at a predetermined normal speed V0 determined in advance. The normal speed V0 is a speed higher than the first speed V1 and the second speed V2, and is 60 km/h, for example. By designing the normal speed V0 as a speed higher than the first speed V1 and the second speed V2 in this manner, normal-time operation efficiency is increased.

Next, the case where the second communication line also is established in addition to the first communication line is explained. It is supposed that the reference distance Y is 35 m as well, and the positional information error 623 also is 10 m as well. It is supposed that the braking distance 621 is a fixed value of 15 m. In this case, the free running distance 622 is 35−10−15=10 [m]. Supposing that the communication delay of the second communication line is one second, the first speed V1 is 10/1=10 [m/s]=36 [km/h].

Accordingly, in a case where it is decided that the inter-vehicle distance X to the manned vehicle 20 is equal to or shorter than the reference distance Y, the unmanned dump 10 is decelerated to 36 km/h, and passes by the manned vehicle 20 at 36 km/h while ensuring safety. In this manner, the unmanned dump 10 can continue travelling at a speed higher than the travel speed (18 km/h) of the unmanned dump 10 in a case where the first communication line is used, and it becomes possible to reduce unnecessary decelerations of autonomous travel vehicles while maintaining safety. In this manner, enhancement of the safety and enhancement of the productivity are attained at the same time.

Note that whereas a method of increasing a travel speed to which the unmanned dump 10 is decelerated while ensuring safety in a case where the unmanned dump 10 passes by the manned vehicle 20 is mentioned in the explanation described above, a method of shortening a length of time of deceleration while ensuring safety in a case where the unmanned dump 10 passes by the manned vehicle 20 may be adopted.

Figure 7:
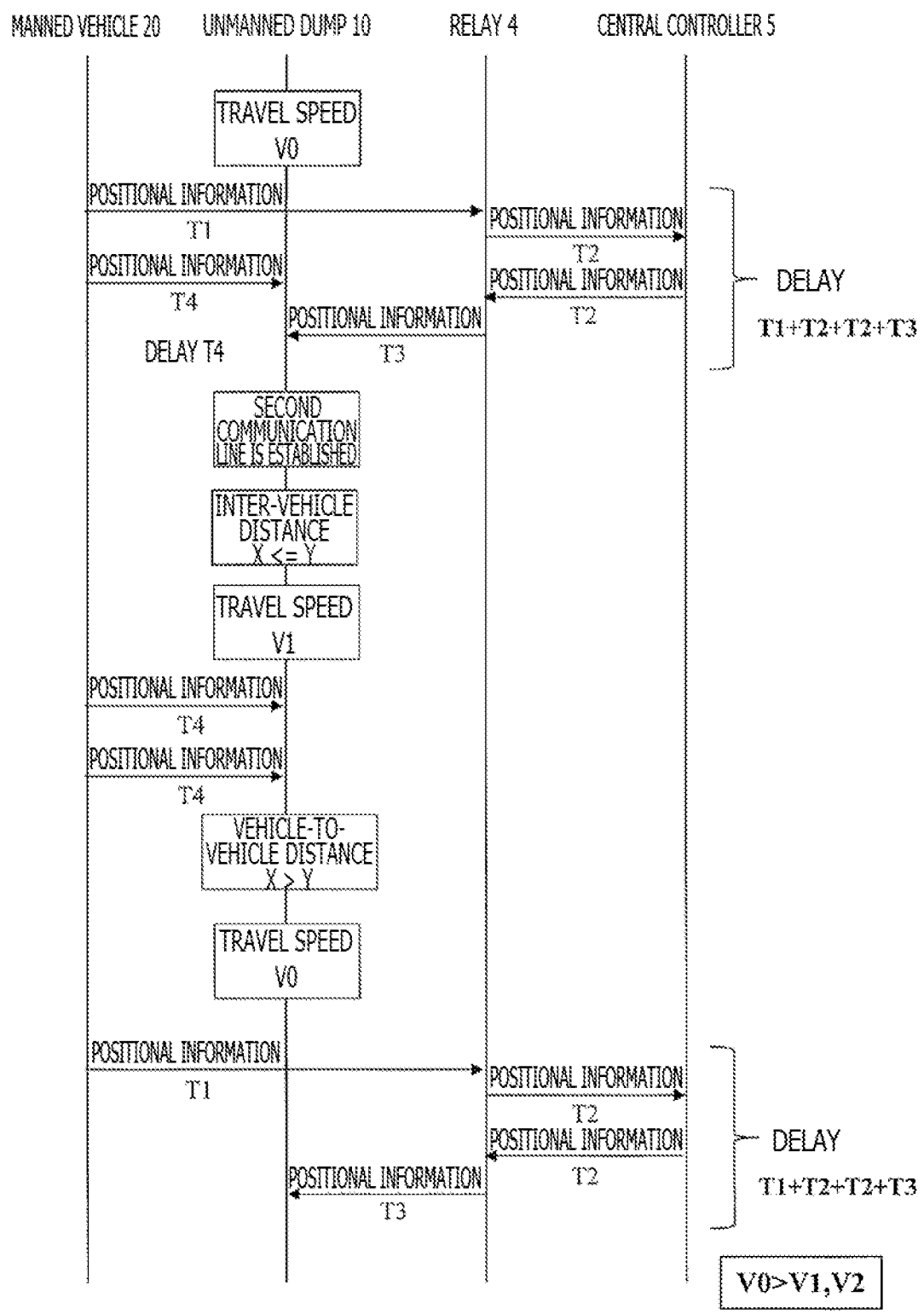
FIG. 7 is a sequence diagram depicting overall operation of the vehicle control system in FIG. 1 in a case where a second communication line is established.

Next, with reference to a sequence diagram in FIG. 7, the overall procedure of a manned vehicle 20, an unmanned dump 10, a relay base station 4, and the central-control base station 5 in a case where the second communication line is established is explained. The unmanned dump 10 is travelling at the predetermined normal speed V0.

The manned vehicle 20 transmits, to the relay base station 4, information about its own position by using the first communication line, that is, by using the infrastructure-to-vehicle communication 520 using the infrastructure-to-vehicle communication subframe 1520, at intervals of a predetermined length of time (e.g. one second). The relay base station 4 transmits, to the central-control base station 5, the positional information about the manned vehicle 20 by using the infrastructure-to-infrastructure communication 510 using the infrastructure-to-infrastructure communication subframe 1510. The central-control base station 5 transmits, to the relay base station 4, the positional information about the manned vehicle 20 by using the infrastructure-to-infrastructure communication 510 using the infrastructure-to-infrastructure communication subframe 1510. The relay base station 4 transmits, to the unmanned dump 10, the positional information about the manned vehicle 20 by using the infrastructure-to-vehicle communication 520 using the infrastructure-to-vehicle communication subframe 1520. The communication delay of the first communication line is (T1+T2+T2+T3).

In addition, the manned vehicle 20 directly transmits the information about its own position also by using the second communication line, that is, by using the vehicle-to-vehicle communication 550 using the vehicle-to-vehicle communication subframe 1550, at intervals of a predetermined length of time (e.g. one second). The communication delay of the second communication line includes only T4.

The unmanned dump 10 gets to be able to receive the second communication line, that is, the second communication line is established, when the manned vehicle 20 approaches the unmanned dump 10. It is supposed that the manned vehicle 20 further approaches the unmanned dump 10, and the inter-vehicle distance X has become equal to or shorter than the reference distance Y. In a case where the inter-vehicle distance X is equal to or shorter than the reference distance Y, the unmanned dump 10 decides whether or not the second communication line is established.

In a case where it is decided that the second communication line is established, the unmanned dump 10 sets the upper limit of its own travel speed to the first speed V1. The specific process of the speed control at this time can be designed by those skilled in the art as appropriate. Note that while the inter-vehicle distance X is equal to or shorter than the reference distance Y, the unmanned dump 10 may receive the positional information about the manned vehicle 20 transmitted by using the second communication line, and calculate the inter-vehicle distance X.

It is supposed that thereafter the manned vehicle 20 moves away from the unmanned dump 10, and it is decided that the inter-vehicle distance X between the manned vehicle 20 and the unmanned dump 10 has become longer than the reference distance Y. In a case where the inter-vehicle distance X is longer than the reference distance Y, the unmanned dump 10 sets the upper limit of its own travel speed to the normal speed V0. The specific process of the speed control at this time can be designed by those skilled in the art as appropriate.

Figure 8:
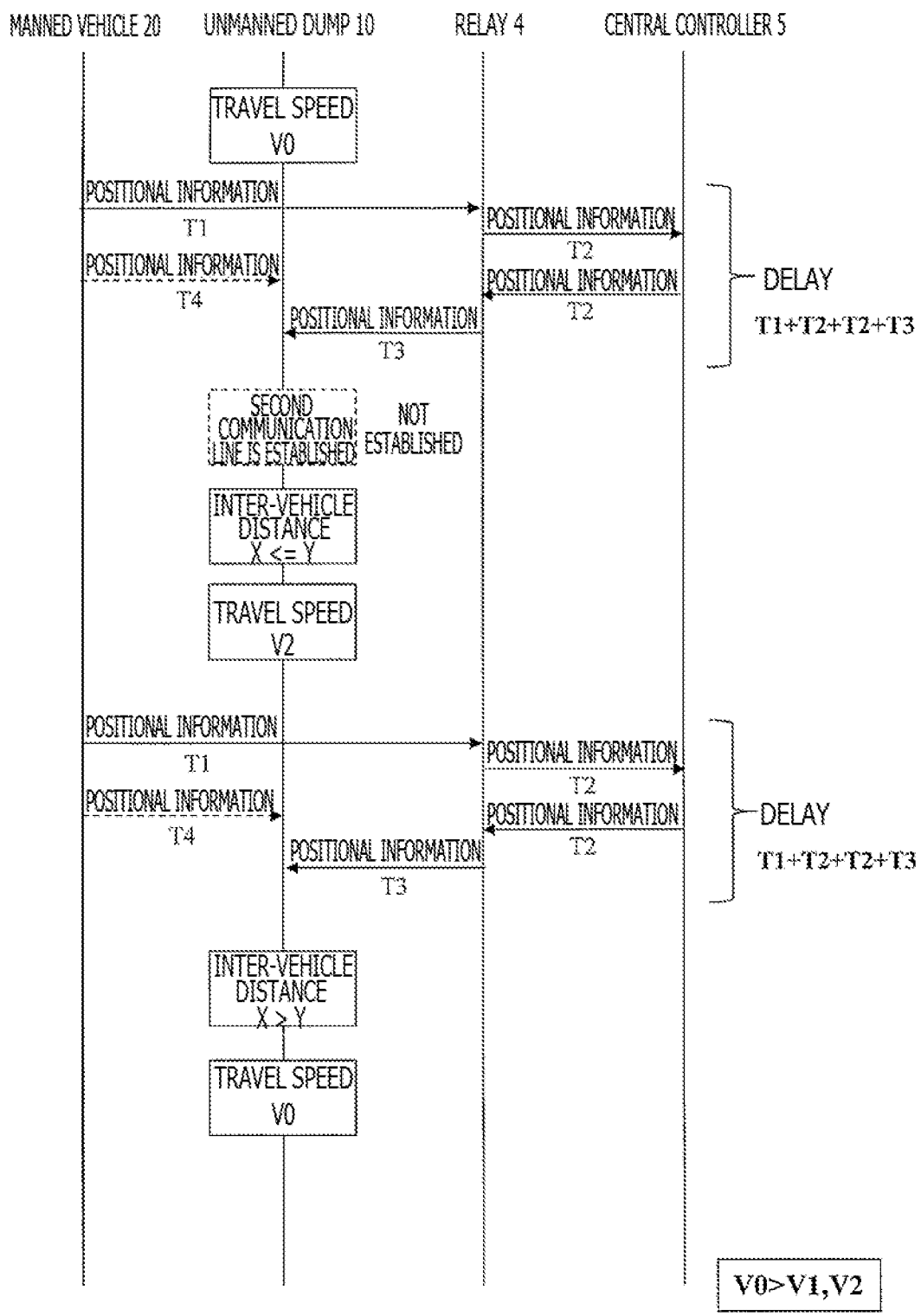
FIG. 8 is a sequence diagram depicting overall operation of the vehicle control system in FIG. 1 in a case where the second communication line is not established.

Next, with reference to a sequence diagram in FIG. 8, the overall procedure of a manned vehicle 20, an unmanned dump 10, a relay base station 4, and the central-control base station 5 in a case where the second communication line is not established is explained. The manned vehicle 20 is travelling at the predetermined normal speed V0.

Similarly to the case in FIG. 7, the manned vehicle 20 uses the first communication line and the second communication line to transmit information about its own position.

Although the unmanned dump 10 is designed to be capable of receiving the second communication line if the manned vehicle 20 has approached the unmanned dump 10, the second communication line is not established depending on the wireless environment, in some cases. It is supposed that when the manned vehicle 20 approaches the unmanned dump 10, and the inter-vehicle distance X has become equal to or shorter than the reference distance Y, it is decided that the second communication line is not established. In this case, the unmanned dump 10 sets the upper limit of its own travel speed to the second speed V2. The specific process of the speed control at this time can be designed by those skilled in the art as appropriate. In this case, the unmanned dump 10 receives positional information about the manned vehicle 20 transmitted by using the first communication line, and calculates the inter-vehicle distance X.

It is supposed that thereafter if the manned vehicle 20 moves away from the unmanned dump 10, the unmanned dump 10 sets the upper limit of its own travel speed to the normal speed V0, similarly to the case in FIG. 7.

Note that although not depicted, an emergency stop signal is transmitted along with the positional information, and it is possible for the manned vehicle 20 to emergently stop the unmanned dump 10 any time by operation of the emergency stop button.

Note that in a case where the second communication line has been established at a time point at which the inter-vehicle distance X between the manned vehicle 20 and the unmanned dump 10 has become equal to or shorter than the reference distance Y, and thereafter the second communication line is no longer established while the inter-vehicle distance X is equal to or shorter than the reference distance Y, speed control is executed such that the travel speed of the unmanned dump 10 is switched from the first speed V1 to the second speed V2.

As explained above, according to the vehicle control system of the first embodiment, in a case where it is decided that the inter-vehicle distance X between the unmanned dump 10 and the manned vehicle 20 is equal to or shorter than the reference distance Y decided in advance, the unmanned dump 10 decides whether or not the second communication line is established. Then, in a case where the second communication line is established and communication therethrough is possible, the travel speed of the unmanned dump 10 can be increased or the deceleration time can be shortened as compared to a case where the second communication line is not established and communication therethrough is not possible, and thus the mining work efficiency of a mine can be enhanced.

Note that the method for deciding whether or not the second communication line is established can be designed by those skilled in the art as desired. For example, the decision can be made on the basis of received power, a bit error rate, a packet error rate, and the like, but these are not the sole examples.

According to this first embodiment, a vehicle control system that makes it possible to ensure the safety and enhance the productivity at the same time can be provided.

Note that whereas control is performed to decelerate an unmanned dump 10 at a time of approach in the explanation described above, instead of deceleration, control can also be performed to cause an unmanned dump 10 to take a bypass route, and so on. That is, as long as a technique for avoiding a collision between an unmanned dump 10 and another vehicle or the like is adopted, the method of avoiding such a collision is not limited to a particular one.

[Configuration Example of Vehicle-Mounted Transmitting Terminal 2]

A block diagram in FIG. 9 depicts a configuration example of the vehicle-mounted transmitting terminals 2 according to the embodiment described above. As an example, a vehicle-mounted transmitting terminal 2 has a transmission/reception antenna 101, a wireless apparatus 102, a power supply apparatus 105, a display apparatus 106, an emergency stop button 107, a controller 108, a GPS receiver 109, and a GPS antenna 110. In addition, the controller 108 includes a microcomputer apparatus 104 and a baseband apparatus 103. The wireless apparatus 102 may have the functionality of the baseband apparatus 103.

The power supply apparatus 105 includes, a battery 810, a voltage converter 811, and the like. The power supply apparatus 105 has a functionality of converting electric power supplied from the battery 810 into a required voltage at the voltage converter 811, and thereafter supplying the electric power to each section in the vehicle-mounted transmitting terminal 2.

The display apparatus 106 includes an LED, a liquid crystal display apparatus, or the like, and is connected to the power supply apparatus 105 and the microcomputer apparatus 104. The display apparatus 106 has a functionality of informing an operator of the normality of the power supply and a result of an out-of-range determination about a wireless area.

The emergency stop button 107 is connected with the microcomputer apparatus 104 of the controller 108, and includes an operation button to be used by the operator to give a command for emergently stopping an unmanned dump 10. Similarly to the emergency stop input apparatus 32 of the control center 30, the emergency stop button 107 gives a command for emergently stopping the unmanned dump 10, but this emergency stop button 107 is provided in the vehicle-mounted transmitting terminal 2. The emergency stop button 107 can have a press-button structure that detects that an instruction from the operator is given when the emergency stop button 107 is pressed. In addition, it is desirable if the emergency stop button 107 has such a mechanism that it is locked in a case where it is pressed, and is kept being pressed unless an unlocking operation is performed.

The GPS receiver 109 is connected with the GPS antenna 110 and the microcomputer apparatus 104 of the controller 108, and acquires positional information representing the current position of the manned vehicle 20 from a GPS reception signal received via the GPS antenna 110. The GPS receiver 109 outputs the positional information representing the current position of the manned vehicle 20 to the microcomputer apparatus 104 regularly (e.g. every second).

The microcomputer apparatus 104 of the controller 108 is a microcomputer. The microcomputer apparatus 104 is connected with the display apparatus 106, the emergency stop button 107, the baseband apparatus 103, and the GPS receiver 109.

The microcomputer apparatus 104 has a CPU 801 (calculation processing apparatus) and a storage apparatus 802 (a main memory, a flash memory, etc.). By calculations of a program stored on the storage apparatus 802 being executed by the CPU 801, functionalities explained below are realized.

Part or the whole of the microcomputer apparatus 104 may be configured by using an integrated circuit or the like. In addition to the functionalities described above, the microcomputer apparatus 104 makes a determination as to whether the power supply apparatus 105 is operating normally, and an out-of-range determination as to whether or not the manned vehicle 20 is in a wireless area formed by each relay base station 4 and the central-control base station 5.

The baseband apparatus 103 of the controller 108 is a unit that is configured by using an integrated circuit or the like, and performs communication with another apparatus in accordance with the time division multiplexing method. The baseband apparatus 103 outputs a signal in a subframe allocated in advance or in a subframe allocated to itself by the infrastructure-to-infrastructure communication 510, in a plurality of subframes obtained by dividing specified unit time (e.g. one second). Under the control of the microcomputer apparatus 104, the baseband apparatus 103 controls the wireless apparatus 102 such that a signal is transmitted in a subframe allocated to itself.

On the basis of control by the baseband apparatus 103, the wireless apparatus 102 implements processes such as error correcting coding, modulation, frequency conversion, filtering, or amplification on data output from the baseband apparatus 103, and generates a wireless signal. The wireless apparatus 102 sends the generated wireless signal to the transmission/reception antenna 101.

Figure 10:
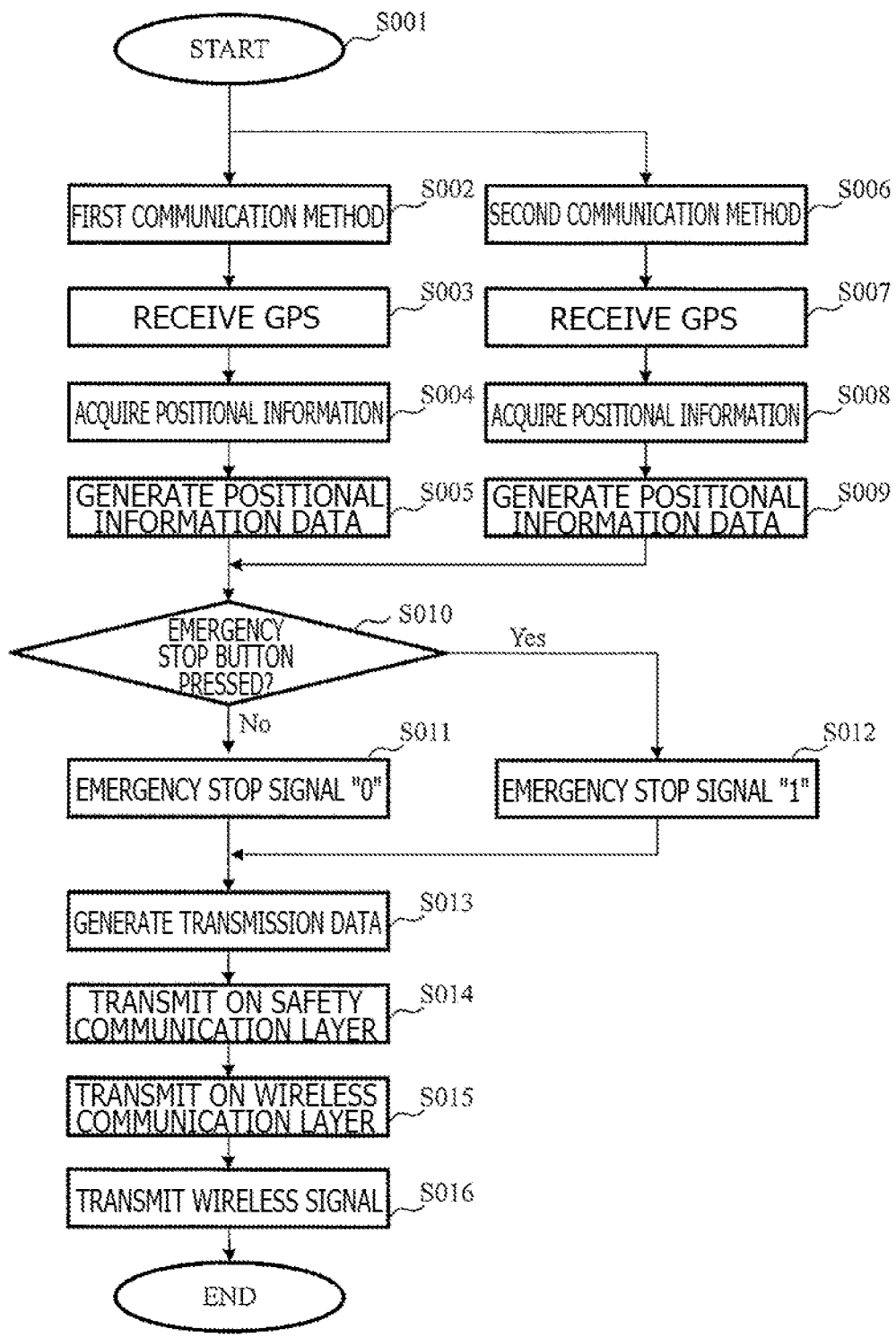
FIG. 10 is a flowchart for explaining operation of the vehicle-mounted transmitting terminal.

Next, operation of a vehicle-mounted transmitting terminal 2 is explained in detail with reference to a flowchart in FIG. 10. It is supposed that the flowchart in FIG. 10 is implemented at intervals of a predetermined length of time (e. g. one second).

As a first communication method, the vehicle-mounted transmitting terminal 2 sets parameters such that the baseband apparatus 103 of the vehicle-mounted transmitting terminal 2 operates on the first communication line (Step S002). For example, a modulation method and a coding rate used for the first communication line are set.

In parallel with this, as a second communication method, the vehicle-mounted transmitting terminal 2 sets parameters such that the baseband apparatus 103 of the vehicle-mounted transmitting terminal 2 operates on the second communication line (Step S006). For example, a modulation method and a coding rate used for the second communication line are set.

After the communication method of the first communication line is set, the GPS antenna 110 of the vehicle-mounted transmitting terminal 2 receives a GPS signal (Step S003), and, on the basis of the GPS signal, the GPS receiver 109 acquires positional information representing the current position of the manned vehicle 20 (Step S004). Then, the microcomputer apparatus 104 generates information data about its own position for the first communication line (Step S005).

After the communication method of the second communication line is set, operation identical to Steps 003 and 004 is performed at Steps S007 and 008. The microcomputer apparatus 104 generates information data about its own position for the second communication line (Step S009).

Subsequently, the process proceeds to Step S010, and it is determined whether or not the emergency stop button 107 is being pressed. In a case where it is determined that the emergency stop button 107 is not being pressed (No at Step S010), the microcomputer apparatus 104 generates an emergency stop signal "0" on an application layer 123 (Step S011). On the other hand, in a case where it is determined that the emergency stop button 107 is being pressed (Yes at Step S010), the microcomputer apparatus 104 generates an emergency stop signal "1" on the application layer 123 (Step S012). The emergency stop signal "1" is an emergency stop command signal.

Then, the microcomputer apparatus generates transmission data including the obtained positional information and emergency stop signal (Step S013). The generated transmission data is subjected to a transmission process necessary for functional safety on a safety communication layer 122, and then transmitted (Step S014). The baseband apparatus 103 implements, on the received data, a transmission process necessary for wireless communication on a wireless communication layer 121.

In a case where the data after being subjected to the transmission process is transmission data generated in accordance with the first communication method, the data is output to the wireless apparatus 102 at a timing at which it is transmitted in a relevant slot of the infrastructure-to-vehicle communication subframe 1520 (Step S015). In a case where the data is transmission data generated according to the second communication method, the data is output to the wireless apparatus 102 at a timing at which it is transmitted in a relevant slot of the vehicle-to-vehicle communication subframe 1550 (Step S015 as well).

The wireless apparatus 102 implements processes such as modulation, frequency conversion, filtering, or amplification on the data received from the baseband apparatus 103, and outputs an ACK signal from the transmission/reception antenna 101 (Step S016). The process loops back to START (S001) every second after this Step S016 is ended.

By the operation according to the flowchart in FIG. 10, information about its own position is transmitted regularly, and while the emergency stop button 107 is being pressed (S010: Yes), "1" is transmitted as an emergency stop signal continuously (i.e. an emergency stop command signal is transmitted). In addition, if the emergency stop button 107 is unlocked (S010: No), the microcomputer apparatus 104 transmits "0" as the emergency stop signal.

Note that by executing the communication method of the first communication line and the communication method of the second communication line in parallel in FIG. 10, it becomes possible to perform stable communication even if the communication distance of the first communication line and the communication distance of the second communication line are significantly different from each other. In addition, the precision of positional information related to the first communication line and the precision of positional information related to the second communication line may be made different from each other.

Since, even if the second communication line is not established, information about its own position is transferred stably by the first communication line, and additionally an emergency stop signal also is transferred, thus the safety never becomes a problem. On the other hand, in a case where the second communication line is established, it becomes possible to increase the travel speed to which an unmanned dump 10 is decelerated, shorten the deceleration time, and so on, thereby attaining enhancement of the productivity.

Note that whereas an embodiment is explained by using, as an example, unmanned dumps of a mining site in the embodiment described above, autonomous travel vehicles are not limited to unmanned dumps at a mine, but may be manned dumps, and may be construction machines or the like at a construction site.

As explained in detail thus far, according to the present embodiment, it is possible to increase the travel speed to which an autonomously-travelling unmanned dump is decelerated, shorten the deceleration time, remotely stopping a moving haulage vehicle at a time of emergency, and so on.

Note that the present invention is not limited to the embodiment described above, but includes various modification examples. For example, the embodiment described above is explained in detail in order to explain the present invention in an easy-to-understand manner, and the present invention is not necessarily limited to the embodiment including all the constituent elements explained. In addition, some of the constituent elements of an embodiment can be replaced with constituent elements of another embodiment, and also the constituent elements of an embodiment can additionally have constituent elements of another embodiment. In addition, some of the constituent elements of each embodiment can additionally have other constituent elements, can be deleted, or can be replaced with other constituent elements. In addition, some or all of constituent elements, functionalities, processing sections, processing means, and the like described above may be realized by hardware by, for example, designing them in an integrated circuit and so on. In addition, constituent elements, functionalities, and the like described above may be realized by software by a processor interpreting and executing a program to realize respective functionalities. Information such as a program, a table, or a file to realize each functionality can be placed in a recording apparatus such as a memory, a hard disk, or an SSD (Solid State Drive) or a recording medium such as an IC card, an SD card, or a DVD.

DESCRIPTION OF REFERENCE CHARACTERS

1: Mobile transmitting terminal (terminal)
2: Vehicle-mounted transmitting terminal (terminal)
3: Vehicle-mounted receiving terminal
4: Relay base station (wireless base station)
5: Central-control base station (wireless base station)
10: Unmanned dump (autonomous travel vehicle)
20: Manned vehicle
30: Control center
31: Operation management system
32: Emergency stop input apparatus (terminal)
33: Cable line
100: Road
101: Transmission/reception antenna
102: Wireless apparatus
103: Baseband apparatus
104: Microcomputer apparatus
105: Power supply apparatus
106: Display apparatus
107: Emergency stop button
108: Controller
109: GPS receiver
110: GPS antenna
200: Loading site
300: Soil-dropping site
500: Control communication
510: Infrastructure-to-infrastructure communication (first communication line)
520: Infrastructure-to-vehicle communication (first communication line)
530: Pedestrian-to-vehicle communication
540: Pedestrian-to-infrastructure communication
550: Vehicle-to-vehicle communication (second communication line)
600: Movable range
1000: Vehicle control system
T1 to T4: Communication delay
V0: Normal speed
V1: First speed
V2: Second speed
X: Inter-vehicle distance
Y: Reference distance All the publications, patents, and patent applications cited in the present specification are incorporated without changes into the present specification by reference.

The invention claimed is:

1. A vehicle control system comprising:
an autonomous travel vehicle on which a vehicle-mounted receiving terminal that acquires and receives its own positional information is mounted, wherein the autonomous travel vehicle is configured to travel autonomously;
a manned vehicle on which a vehicle-mounted transmitting terminal that acquires and transmits its own positional information is mounted, wherein the manned vehicle travels according to an operation by a driver; and
a first communication line and a second communication line that connect the vehicle-mounted receiving terminal of the autonomous travel vehicle and the vehicle-mounted transmitting terminal of the manned vehicle with each other via communication lines different from each other, wherein the vehicle-mounted transmitting terminal of the manned vehicle transmits positional information about the manned vehicle by using the first communication line and the second communication line, the vehicle-mounted receiving terminal of the autonomous travel vehicle uses the first communication line to receive the positional information about the manned vehicle, the vehicle-mounted receiving terminal of the autonomous travel vehicle decides whether or not an inter-vehicle distance between the autonomous travel vehicle and the manned vehicle is equal to or shorter than a reference distance on a basis of the positional information about the manned vehicle and positional information about the autonomous travel vehicle, in a case where the inter-vehicle distance is equal to or shorter than the reference distance, the vehicle-mounted receiving terminal of the autonomous travel vehicle decides whether or not the second communication line is established between the vehicle-mounted receiving terminal of the autonomous travel vehicle and the vehicle-mounted transmitting terminal of the manned vehicle, in a case where the vehicle-mounted receiving terminal decides that the second communication line is established between the vehicle-mounted receiving terminal of the autonomous travel vehicle and the vehicle-mounted transmitting terminal of the manned vehicle, the autonomous travel vehicle travels under speed control with an upper limit of a travel speed at a first speed, in a case where the vehicle-mounted receiving terminal decides that the second communication line is not established between the vehicle-mounted receiving terminal of the autonomous travel vehicle and the vehicle-mounted transmitting terminal of the manned vehicle, the autonomous travel vehicle travels under speed control with an upper limit of a travel speed at a non-zero second speed, a communication delay related to the second communication line is shorter than a communication delay related to the first communication line, and the first speed is higher than the second speed.

2. The vehicle control system according to claim 1, wherein the first communication line is a communication line that goes through a wireless base station, and the second communication line is a communication line that does not go through a wireless base station.

3. The vehicle control system according to claim 1, further comprising a terminal that can transmit an emergency stop command signal as an instruction for stopping the autonomous travel vehicle.

4. The vehicle control system according to claim 3, wherein the manned vehicle includes the terminal, and uses the first communication line to transmit the emergency stop command signal.

5. The vehicle control system according to claim 1, wherein the first communication line and the second communication line are used in a time division multiplexing method in a mutually overlapping frequency band.

6. The vehicle control system according to claim 1, wherein the upper limit of the travel speed of the autonomous travel vehicle is set to a predetermined normal speed in a case where the inter-vehicle distance is longer than the reference distance, and the normal speed is higher than the first speed and the second speed.

* * * * *